United States Patent [19]

Heil et al.

[11] Patent Number: 4,666,783
[45] Date of Patent: * May 19, 1987

[54] MAGNETIC RECORDING MEDIA

[75] Inventors: Guenter Heil, Ludwigshafen; Werner Lenz, Bad Durkheim; Jenoe Kovacs, Hessheim, all of Fed. Rep. of Germany

[73] Assignee: BASF Aktiengesellschaft, Fed. Rep. of Germany

[*] Notice: The portion of the term of this patent subsequent to Dec. 17, 2002 has been disclaimed.

[21] Appl. No.: 734,185

[22] Filed: May 15, 1985

[30] Foreign Application Priority Data

May 18, 1984 [DE] Fed. Rep. of Germany ....... 3418482

[51] Int. Cl.$^4$ ............................................. G11B 5/702
[52] U.S. Cl. ............................. 428/425.9; 252/625.4; 427/44; 427/128; 428/694; 428/900
[58] Field of Search .................. 427/44, 128; 428/694, 428/900, 425.9; 252/62.54; 360/134–136

[56] References Cited

U.S. PATENT DOCUMENTS

| | | | |
|---|---|---|---|
| 3,124,605 | 3/1964 | Wagner | 260/453 |
| 3,392,183 | 7/1968 | Windemuth et al. | 260/453 |
| 3,394,111 | 7/1968 | Liebsch | 260/77.5 |
| 3,871,908 | 3/1975 | Spoor | 528/44 |
| 3,919,218 | 11/1975 | Schmitt et al. | 260/248 |
| 4,045,462 | 8/1977 | Bock et al. | 260/453 |
| 4,051,165 | 9/1977 | Wagner et al. | 260/453 |
| 4,276,228 | 6/1981 | Nishino et al. | 260/453 |
| 4,314,048 | 2/1982 | Doi et al. | 528/44 |
| 4,410,597 | 10/1983 | Nishino et al. | 428/423.1 |
| 4,415,630 | 11/1983 | Kubota | 428/694 |
| 4,533,565 | 8/1985 | Okita | 428/694 |
| 4,557,813 | 12/1985 | Heil | 428/694 |
| 4,559,118 | 12/1985 | Heil | 428/694 |
| 4,560,456 | 12/1985 | Heil | 428/694 |
| 4,560,616 | 12/1985 | Okita | 428/522 |
| 4,576,866 | 3/1986 | Okita | 428/694 |

FOREIGN PATENT DOCUMENTS

| | | |
|---|---|---|
| 1201992 | 5/1978 | Fed. Rep. of Germany . |
| 1174759 | 1/1979 | Fed. Rep. of Germany . |
| 1090196 | 1/1980 | Fed. Rep. of Germany . |
| 1101394 | 2/1980 | Fed. Rep. of Germany . |
| 886818 | 1/1962 | United Kingdom ........... 2/3 |
| 1234972 | 6/1971 | United Kingdom . |
| 1357012 | 6/1974 | United Kingdom . |
| 1361518 | 7/1974 | United Kingdom . |
| 1375177 | 11/1974 | United Kingdom . |
| 1391066 | 4/1975 | United Kingdom . |
| 1483942 | 8/1977 | United Kingdom . |
| 1511716 | 5/1978 | United Kingdom . |
| 1519157 | 7/1978 | United Kingdom . |
| 1583412 | 1/1981 | United Kingdom . |
| 1583413 | 1/1981 | United Kingdom . |

Primary Examiner—Ellis P. Robinson
Attorney, Agent, or Firm—Keil & Weinkauf

[57] ABSTRACT

Magnetic recording media comprise a non-magnetic base and one or more magnetic layers consisting of an organic binder matrix containing finely divided magnetic material, the said binder matrix being obtained by electron beam curing of a mixture of from 60 to 100% by weight of a polyurethane acrylate polymer possessing polymerizable acrylate double bonds and from 0 to 40% by weight of an acrylate monomer and/or an acrylate prepolymer and/or an N-vinyl monomer.

5 Claims, 1 Drawing Figure

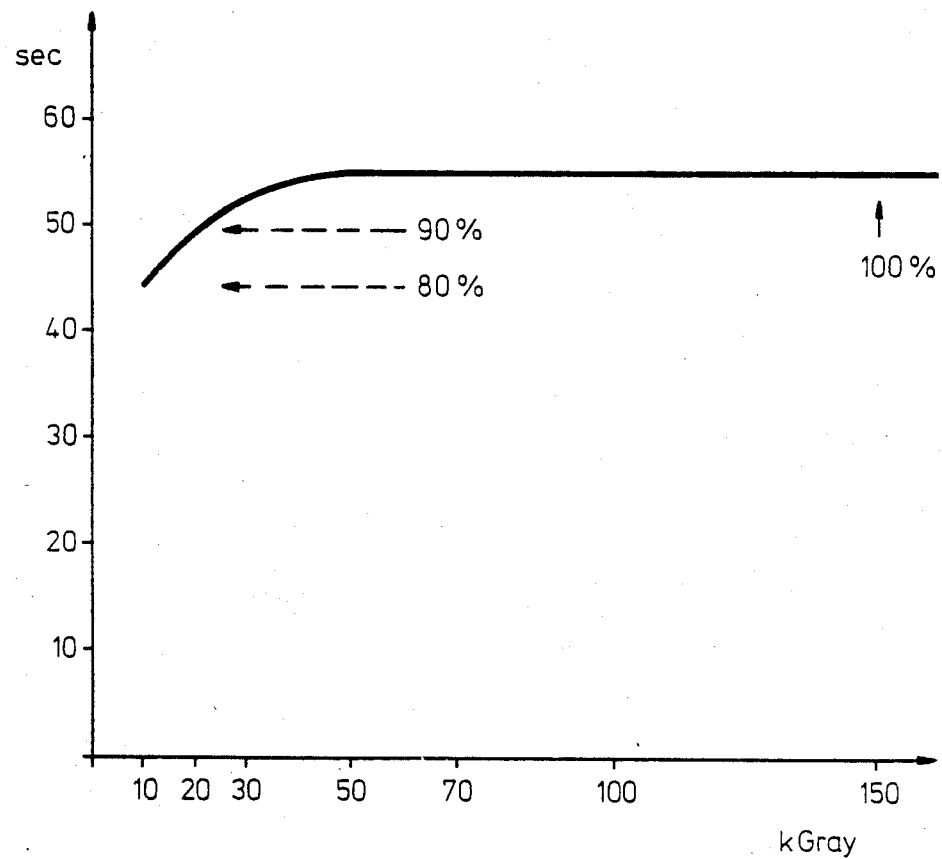

MAGNETIC RECORDING MEDIA

The present invention relates to magnetic recording media which comprise a non-magnetic base and one or more magnetic layers consisting of an organic binder matrix containing finely divided magnetic material, the said binder matrix being obtained by electron beam curing of a mixture of from 60 to 100% by weight of a polyurethane acrylate polymer possessing polymerizable acrylate double bonds and from 0 to 40% by weight of an acrylate monomer and/or an acrylate prepolymer and/or an N-vinyl monomer.

The magnetic recording media predominantly used at present, in the form of audio, video and computer tapes and other magnetic computer media possessing flexible or rigid bases, eg. floppy disks or hard disks, are generally produced as follows: magnetic dispersions are prepared from magnetic pigments and binders possessing good mechanical properties, the dispersions are applied to bases, the magnetic particles are, if required, oriented magnetically, drying is carried out physically by evaporating, in general, large amounts of solvents, and the surface is smoothened and, if required, then chemically cross-linked to produce hard-wearing layers.

In the case of particularly high quality flexible recording media, these binders predominantly consist of tough high molecular weight thermoplastics, eg. polyurethanes, and thermal crosslinking agents, eg. polyfunctional isocyanates. In this procedure, drying and partial curing are carried out in a drying oven, directly after application of the layer to the base. Complete curing takes place slowly in the course of from a few days to weeks. It is true that such binder systems which are selected for the production of magnetic recording media capable of withstanding severe mechanical stresses give magnetic layers which have excellent mechanical properties, eg. low abrasion, good adhesion to the base, the ability to withstand the various changes in the direction of the tape path without breaking or sticking, a long service life even under different climatic conditions, etc.; however, they are also expensive to manufacture.

For example, the high molecular weights make it necessary to use a large amount of solvent for processing.

Another disadvantage of using high molecular weight thermoplastics is that this procedure leads indirectly to a deterioration in the magnetic properties of the magnetic materials. During the dispersing procedure, a certain proportion of the acicular magnetic particles are comminuted, and this leads to tape noise and a poorer signal to print-through ratio. The high molecular weight of the binder necessary to achieve very high mechanical quality imposes a certain limit with regard to more rapid dispersing under milder conditions. There is in principle also a limit in connection with the magnetic orienting of the pigments in the still liquid layer shortly after the coating procedure, the binder offering resistance to orientation. The better the orientation ratio, the better is the sensitivity and the maximum output level for a particular pigment type and a given pigment concentration.

The use of isocyanates for thermal crosslinking of high molecular weight thermoplastics for the production of magnetic layers likewise entails disadvantages or is very expensive. As a 2-component system, it is possible to prepare only relatively small amounts if pot-life problems are to be avoided. In order to achieve uniform production of very high quality products, a large number of influences in the course of production have to be monitored and precisely controlled. The process is therefore sensitive to any disturbances which may occur, and this can result in production losses.

It has therefore been proposed to use binders which can be cured by an electron beam and are based on special polyurethane acrylate polymers, with which it is possible to provide dispersions of magnetic particles for the production of magnetic recording media, the said dispersions requiring a substantially shorter dispersing time and only about half the amounts of solvents used in the present-day very high quality magnetic recording media, and, after curing by irradiation of the binders, possessing much better mechanical strength than the previously used electron-beam-curable surface coating binders and hence meeting the particular requirements for magnetic recording media, as had been met up to then only by chemical crosslinking of high molecular weight thermoplastic polymers. These polyurethane acrylates have a broad molecular weight distribution and, for the most part, have a higher molecular weight than the electron-beam-curable binders used up to then. However, the molecular weights are lower than those of the conventional binders used in magnetic dispersions. These polyurethane acrylates are straight-chain and contain polymerizable acrylate double bonds at each end of the chain of molecules. For curing with virtually complete crosslinking, they require an electron beam energy dose of about 50–70 kGray. Depending on the intensity of the electron beam unit used, this permits transport speeds of about 40–80 m/min. Hence, for the production of magnetic recording media at production speeds of up to 200 m/min, it is necessary to use a plurality of beam apertures in succession, which entails correspondingly high capital costs.

Attempts have therefore been made to improve the electron-beam-curable binders so that they require a very low curing dose and hence have a higher curing rate. It is known that higher curing rates can be obtained by using compounds which contain more than two acrylate double bonds in the molecule, eg. trimethylolpropane triacrylate and pentaerythritol tri- or tetraacrylate. However, these compounds generally have to be used in amounts of more than about 30% by weight so that the radiation dose required for complete curing is no more than about 25–40 kGray. Another possibility is the use of branched prepolymers containing three or more double bonds per molecule and having molecular weights of not more than 1,000–2,000. The use of the conventional types and amounts of branched monomers and prepolymers for improving the reactivity or decreasing the curing dose in binders for magnetic recording media resulted in a deterioration in the extensibility of these binders, which as a rule should be greater than 100%. Contrary to expectations, even the tensile strength of such binders deteriorated when an attempt was made to so adjust the hardness that very high extensibility was still obtained.

It is an object of the present invention to further develop magnetic recording media which comprise a non-magnetic base and one or more magnetic layers consisting of an organic binder matrix containing finely divided magnetic material, the said matrix being obtained by electron beam curing of a mixture of from 60 to 100% by weight of a polyurethane acrylate polymer possessing polymerizable acrylate double bonds and from 0 to 40% by weight of one or more acrylate monomers and/or acrylate prepolymers and/or N-vinyl monomers, so that the advantages of a binder matrix produced by electron beam curing, resulting in recording media having very good mechanical and magnetic properties, and in the high elasticity necessary for magnetic layers, are retained but a higher curing rate can nevertheless be achieved.

We have found that this object is achieved, and that magnetic recording media of the said type meet the set requirements if the polyurethane acrylate polymer is branched and consists of (1) one or more diisocyanates,
(2) one or more oligomeric or polymeric diols,
(3) one or more low molecular weight diols,
(4) one or more monohydroxyalkyl acrylates and
(5) one or more low molecular weight triols, and the amount of NCO groups of the diisocyanate is from 95 to 105% of the number of equivalents of OH groups of components 2, 3, 4 and 5 and the molar amounts of the OH-containing components are chosen so that the concentration of urethane groups is from 2.4 to 3.7 moles per kg of polyurethane acrylate polymer and the mean number of acrylate groups per average molecule is greater than two and less than four, with the proviso that the polymer has a broad molecular weight distribution, the number-average molecular weight is from 2,000 to 10,000 and the ratio of the weight-average to the number-average molecular weight is from 2.2 to 3.5.

The present invention furthermore relates to a process for the production of these magnetic recording media.

Because of its method of preparation, the polyurethane acrylate polymer which alone or predominantly constitutes the binder matrix of the novel magnetic recording media which is formed by means of electron beam curing, contains not only molecules which have a very low molecular weight and, in the simplest case, are formed only from one diisocyanate molecule and two hydroxyalkyl acrylate molecules, but also molecules which have a very high molecular weight, ie. above 100,000. Furthermore, there is also a small amount of compounds which contain only one type of diol in the molecule and are not branched. Although for number-average molecular weights of, for example, 6,000 it is still possible to detect molecular weights of about 110,000–120,000 by means of high pressure gel chromatography, the weight-average molecular weight of the entire polyurethane acrylate mixture is substantially lower and is about 14,000–18,000 for a number-average molecular weight of about 5,000–6,000.

The magnitude of the molecular weight can be used to influence, within certain limits, not only the mechanical properties and flow behavior, but also the dispersing behavior, solvent requirement and magnetic properties. The mechanical properties generally improve as the molecular weight increases. For high toughness requirements, as in the case of, for example, highly pigmented magnetic tapes, number-average molecular weights of about 5,000–8,000 are preferred. For rigid and flexible disk coatings which have to meet comparatively low elasticity requirements and, in some cases, more stringent requirements with regard to flow behavior or abrasion resistance, molecular weights of about 2,000–6,000 are preferred.

To obtain the desired degree of branching, an alcohol having more than two hydroxyl groups in the molecule is used. In the simplest case, aliphatic triols, such as trimethylolpropane or glycerol, are employed, but cyclic triols are also very useful. Triols modified with ethylene oxide or propylene oxide can also be used.

The double bond functionality of the polyurethane acrylate is controlled by means of the ratio of the number of equivalents of triol to that of monohydroxyalkyl acrylate. A ratio of 1:1 gives an average polyurethane acrylate molecule with a random distribution and a degree of branching of three, and hence with one triol unit and three acrylate double bonds in the polymer molecule.

When branching is introduced, the reactivity is improved as the amount of triol increases. An exact stoichiometric ratio of triol to hydroxyalkyl acrylate is not important. Ratios of from 0:1 to 1:1 give mixtures of molecules having a degree of branching of two with those having a degree of branching of three. Ratios greater than 1:1 give mixtures of molecules having a functionality of three with those having a functionality of four, lower and higher degrees of branching also occurring in smaller random amounts.

A mean functionality of from 2.5 to 3.5 is preferred. With lower values, the reactivity approaches that of the straight-chain polyurethane acrylates. At higher values, there is no further improvement, it is difficult to maintain good mechanical properties and, depending on the molecular weight of the other hydroxy components selected, the molecular weight may increase in an undesirable manner beyond the desired optimum calculated range.

In order to obtain flexible products which have a high tensile strength coupled with good abrasion resistance, it is necessary to correlate the degree of branching and the molecular weight. The higher the selected molecular weight, the higher the degree of branching may be. The amount of hydroxyalkyl acrylate in relation to the other polyfunctional hydroxy components determines the resulting molecular weight.

The molecular weight and the functionality fix the crosslinking concentration of the acrylate double bonds and hence the network density of the irradiated and polymerized magnetic recording layer and, to a decisive extent, also the greatest possible elasticity.

Another possible method of controlling the network density is the addition of compounds having fairly high double bond concentrations, in the form of prepolymers and monomers. Although the stated polyurethane acrylates can be used as the sole binders, the presence of as much as 40% by weight of prepolymers and monomers may be advantageous. For magnetic tape applications, amounts of from 80 to 95% of polyurethane acrylate are preferred, whereas for applications where the flexibility does not have to meet such high requirements it is preferable to use from 60 to 85% of polyurethane acrylate, the remainder of the binder to 100% preferably consisting of other radiation-curable components.

By adding prepolymers and monomers, the reactivity can be further increased. So that the desired effect is obtained and little or no deterioration in the mechanical properties results, it is necessary to formulate the binder mixture appropriately.

Great toughness and high reactivity can be achieved simultaneously if the concentration of acrylate double bonds, which are present in polyfunctional compounds, is from 0.4 to 1.5, preferably from 0.6 to 1.2, moles of acrylate double bonds per kg of binder mixture for magnetic tape applications, and the distribution of the functionalities of the double bonds over large and small molecules in such that the number-average functionality is from 1.5 to 3 and the ratio of the weight-average to the number-average of the functionality is from 0.8 to 2.3, preferably from 1.2 to 1.8. Hence, the number-average can be smaller the larger the ratio of weight-average to number-average.

These ratios can be obtained by using, for example, trifunctional polyurethane acrylate, small amounts, less than 10%, preferably less than 5%, of highly crosslinking acrylate monomers, such as trimethylolpropane acrylate, bifunctional acrylate prepolymers and/or acrylate monomers, and small amounts, not more than 10%, of monofunctional acrylate or N-vinyl monomers. The use of prepolymers and monomers which effect less pronounced crosslinking is particularly advantageous for increasing the curing rate and achieving complete curing with a very low residual monomer content coupled with a low curing dose. Hence, it is also possible to obtain rapidly curing flexible coatings using fairly small amounts of about 10%, but not more than 15%, of bifunctional monomers.

Rapid curing coupled with a low radiation dose, which is an object of the present invention, depends both on the stated parameters, such as the type of reactive double bonds and their distribution over molecules of different molecular weights and functionalities, and on their mobility in the network formed during irradiation. This mobility is influenced by the structure and composition of the selected components, the reaction temperature, the amount of residual solvents and is characterized by, for example, the hardness, the glass transition temperature or the modulus of elasticity of the binder formulation.

For the purposes of the present invention, curing is not the conversion of all reactive double bonds but the achieving of properties which do not alter significantly on further irradiation. A distinction should be made between this and a still smaller curing dose which can frequently be used and which, in spite of a lower degree of curing, is sufficient to give satisfactory performance characteristics for the particular application and is therefore the dose usually stated. However, the use of such a low curing dose can be unsatisfactory in that it results in a higher content of residual monomers and subsequent reactions, and therefore changes in the properties of the finished article may take place during aging. Hence, the required curing dose is always defined below as a dose with which the level of the mechanical properties achieved, eg. hardness, is not less than 80–90% of the final value.

According to the invention, magnetic recording media which have high elasticity and excellent mechanical properties, and are based on electron-beam-curable binders can be produced using a curing dose which is only 50–70% of the dose required for conventional binders exhibiting good mechanical properties, less than 5–10% of prepolymers or monomers which are trifunctional or have a higher functionality being needed. In many cases, distinctly higher curing rates can be achieved even without such compounds.

In order to obtain novel magnetic recording media which have good mechanical properties, it is necessary for the molecular weights of the main polymer in the form of the polyurethane acrylate to exhibit a broad distribution and for their mean molecular weight to be relatively high compared with conventional electron-beam-curable surface coating binders. Furthermore, a minimum amount of urethane groups is necessary to achieve great toughness; on the other hand, because good flow behavior and very good mechanical properties are required, this amount should not be too high. These properties can be controlled by means of the ratio of low molecular weight diols to polymeric diols. Since the individual components of the polyurethane acrylates can be chosen so that they have very different equivalent weights, there is a wide range of possibilities for varying this ratio of equivalent weights. The ratio should be chosen so that when the types of components in the polyurethane acrylate have been selected, and the molecular weight and the functionality have been predetermined, the resulting concentration of urethane groups is from 2.4 to 3.7, preferably from 2.7 to 3.5, moles per kg.

The hardness, the glass transition temperature or the modulus of elasticity of the irradiated and polymerized products increases with increasing urethane concentration so that, depending on the desired application, it is possible to obtain more elastic products for magnetic tapes or harder products for magnetic disks.

Other measures for varying the hardness include the selection of hard or soft prepolymers and/or monomers during formulation of the binder mixture, and variation of the crosslinking concentration for this mixture within the conventional range.

Diisocyanates (component 1) which are suitable for the preparation of the polyurethane acrylate polymers are aliphatic, cycloaliphatic or aromatic compounds, such as hexamethylene diisocyanate, 2,2,4- or 2,4,4-trimethylhexamethylene diisocyanate, isophorone diisocyanate, bis(4-isocyanatocyclohexyl)methane, bis-(3-methyl-4-isocyanatocyclohexyl)-methane, 2,2-bis-(4-isocyanatocyclohexyl)-propane, 4,4'-diphenylmethane diisocyanate, 2,4- and 2,6-toluylene diisocyanate and 1,5-naphthylene diisocyanate.

The isocyanate components used consist exclusively or predominantly of these diisocyanates. For synthesizing branched polyurethane acrylate polymers, the triols intended for this purpose (component 5) can alternatively be replaced by a small amount of isocyanates having more than two isocyanate groups in the molecule, in order to obtain the required functionality, as described above. Examples of such isocyanates are triisocyanates which are derived directly from the corresponding amines, eg. 1,6,11-undecane triisocyanate as described in German Laid-Open Application DOS No. 2,924,149, bicyclo(2.2.1)heptane triisocyanates as described in German Patent No. 2,515,485, 4-isocyanatomethyl-1,8-octamethylene diisocyanate as described in German Laid-Open Application DOS No. 3,109,276, or triisocyanates of aromatic triamines.

Other polyisocyanates are those which are derived from the said diisocyanates by biuretization, for example the biuretization of hexamethylene diisocyanate with water, etc., as described in, inter alia, German Pat. Nos. 1,101,394, 1,174,759 and 1,931,055, and those which can be prepared by catalytic trimerization of some of the isocyanate groups to isocyanurate compounds, for example those prepared from hexamethylene diisocyanate according to German Pat. No. 1,201,992 and German Laid-Open Applications DOS No. 1,644,809, DOS No. 2,325,826, DOS No. 2,724,914 and others, or from isophorone diisocyanate (3-isocyanatomethyl-3,5,5-trimethylcyclohexyl isocyanate) according to British Pat. No. 1,291,066 and German Laid-Open Application DOS No. 2,325,826, or similar isocyanurate-containing polyisocyanates based on 1,4-diisocyanatocyclohexane, 4,4'-diisocyanatodicyclohexylmethane or 2,4- or 2,6-toluylene diisocyanate.

Branching of the polyurethane acrylates can furthermore be effected by using polyisocyanates prepared from diisocyanates and polyols, in particular those based on toluylene diisocyanate and trimethylolpropane and other alcohols, for example as described in German Pat. No. 1,090,196.

The oligomeric or polymeric diols (component 2) have molecular weights of from 400 to 2,500, preferably from 700 to 2,000. Lower molecular weights result in poorer mechanical properties, while diols having higher molecular weights lead to poorer flow characteristics in some cases. Molecular weights of from 800 to 1,800 are generally preferred. The substances known from the chemistry of the elastomeric polyurethane high polymers can be employed, examples of these being polyesterols, such as adipates based on glycols, polycaprolactones, polyethers and polycarbonates. Polyethers, eg. polytetrahydrofuran, polypropylene glycol and others, are less suitable as the only polydiol components, since they give products which are too soft and more moisture-sensitive, and have an adverse effect on the coefficients of friction. They can therefore generally only be used in the form of mixtures with other polydiols in order to modify properties such as dispersion behavior or adhesion. Preferred polydiols are adipates with glycol (molecular weight 2,000), with diethylene glycol (molecular weight 2,000), with butane-1,4-diol (molecular weight from 900 to 1,100), with hexane-1,6-diol (molecular weight from 800 to 2,500) and with 2,2-dimethylpropane-1,3-diol (molecular weight from 900 to 1,100) and modified adipates of these diols, in which as much as 30 mol % of the aliphatic diol is replaced by a cyclic diol, as also described for component (3). Other preferred polydiols are polycaprolactones (molecular weight from 830 to 2,000) and polycarbonates (molecular weight 2,000). The stated molecular weights are not intended as limits but only as examples for commercial polydiols which have been tested within the scope of the invention.

Some of the polydiols listed are also used as components in high molecular weight polyurethane binders for magnetic recording media, these binders being incapable of further curing. However, in contrast to their use in these high polymers, they are employed here not for building up a two-phase binder system with a soft phase and a hard phase but are used together with other components, in a single-phase binder system having only one glass transition temperature, only for achieving the desired molecular weight with a broad distribution and for controlling the hardness.

Suitable low molecular weight diols (component 3) are those having molecular weights of up to about 500, preferably less than 320. Examples of suitable compounds are ethylene glycol, propane-1,2-diol, propane-1,3-diol, butane-1,4-diol, hexane-1,6-diol, pentane-1,5-diol, decanediol, methylpropane-1,3-diol, 2,2-dimethylpropane-1,3-diol, 2,2-dimethylbutane-1,4-diol, 2-methyl-2-butylpropane-1,3-diol, neopentylglycol hydroxypivalate, diethylene glycol, triethylene glycol, tetraethylene glycol, dipropylene glycol, tripropylene glycol, etc. Cyclic diols are also suitable for this purpose, and are preferably used, eg. 1,4-dihydroxymethylcyclohexane, 4,4'-dihydroxybiscyclohexylmethane, 3(4),8(9)-dihydroxymethyltricyclo(5.1.1.0)decane, 1,4,3,6-dianhydrosorbitol, anhydrosorbitol, oxyethylated or oxypropylated derivatives thereof and oxyethylated or oxypropylated bisphenols, eg. such derivatives of bisphenol A.

Monohydroxyalkyl acrylates (component 4) employed are acrylates which have molecular weights of from 116 to about 350 and which are formally derived from diols or triols and acrylic acid, eg. hydroxyethyl acrylate, 1,2-hydroxypropyl acrylate, 1,3-hydroxypropyl acrylate, butane-1,4-diol monoacrylate, hexanediol monoacrylate, n-butylglycerol ether monoacrylate, 2-ethylhexylglycerol ether monoacrylate or versatic acid glycerol ester monoacrylate. These acrylates can be prepared by a conventional method, either from the corresponding diols by direct esterification or transesterification, or can be obtained in the form of 2-hydroxyalkyl acrylates by reaction of acrylic acid with epoxides, glycidyl ethers or glycidyl esters, eg. ethylene oxide, propylene oxide, butylene oxide, n-butyl glycidyl ether, 2-ethylhexyl glycidyl ether or glycidyl versatate (cf., inter alia, British Pat. No. 1,375,177).

Examples of triols (component 5) are predominantly aliphatic alcohols having molecular weights of up to about 500, preferably less than 300. Both simple triols, such as trimethylolpropane, hexanetriol or glycerol, and oxyethylated or oxypropylated derivatives of these are suitable. Oxyethylation or oxypropylation of amines also gives suitable triols, eg. triethanolamine. However, owing to the catalytic effect of the amines on various isocyanate reactions, a modified method of preparation is necessary. Other suitable compounds are alicyclic and heterocyclic triols, eg. trishydroxyethyl isocyanurate (THEIC).

The triol can be employed not only in pure form but also as a component in polyfunctional isocyanate prepolymers, as used for commercial isocyanate crosslinking agents in 2-component polyurethane coatings.

Because of the better and more uniform definition of functionality in the alcohols, branching of the polyurethane acrylate with the aid of triols is simpler to control than when polyisocyanates are used, and is therefore preferred. For the purposes of the present invention, it may be advantageous to use small amounts of tetraols and pentols, eg. erythritol, pentaerythritol, arabitol, adonitol, xylitol, etc.

The polyurethane acrylate polymers are prepared predominantly in solution. Suitable solvents are those which are free of groups which can react with isocyanates, eg. ketones, ethers and esters, and, if appropriate, also aromatic hydrocarbons or chlorohydrocarbons or mixtures of these. Acetone, methyl ethyl ketone, tetrahydrofuran, dioxane, ethyl acetate and methylene chloride are preferred. However, a minor amount of any other solvent employed today for the production of magnetic recording media using high molecular weight thermoplastic polymers can also be used concomitantly to control particular properties, eg. flow properties. Where ethers are used, care should be taken to ensure that these are free from peroxide so that premature polymerization of the acrylate double bonds does not take place.

For molecular weights up to about 2,000, the polyurethane acrylate polymers can also be prepared in the absence of a solvent. This may be advantageous, for example, if further processing is not carried out immediately but it is intended to store the product temporarily for a relatively long time or to transport it over a relatively long distance.

In the preferred temperature range, the reaction of the isocyanate groups with the hydroxyl groups can also be carried out in the absence of a catalyst. Since the reaction at high conversions is very slow when one reactant is not used in excess, the use of a catalyst is more advantageous. The catalysts which can be used here are those which are known from polyurethane chemistry, eg. tertiary amines, metal salts of fatty acids and other organic metal compounds. The catalysts chosen are preferably those which predominantly catalyze urethane formation and which promote reactions such as allophanate formation of isocyanurate formation as little as possible. Compounds of tetravalent tin, eg. dibutyl-tin dilaurate, are particularly useful. In general, it has proven advantageous to use from 0.005 to 0.3, preferably from 0.01 to 0.15, part by weight per 100 parts by weight of polyurethane acrylate. The catalyst can be initially charged with the starting materials at the beginning of the reaction, can be added to the reaction mixture gradually together with the feed, or can be added in the subsequent stirring phase.

In addition to the polyurethane acrylate polymer, the novel binders preferably contain further radiation-curable components in the form of resins and/or monomers which have a relatively low molecular weight and in general also a relatively narrow molecular weight distribution. Such polymerizable compounds are state of the art in the field of UV-curable or electron-beam-curable coating materials. Reference may be made to, inter alia, German Laid-Open Applications DOS No. 2,049,714, DOS No. 2,049,715, DOS No. 2,064,701, DOS No. 2,232,822, DOS No. 2,249,446, DOS No. 2,358,948, DOS No. 2,441,148, DOS No. 2,452,322, DOS No. 2,636,425 and DOS No. 2,636,426, in which such radiation-curable components are described for other applications, such as surface coatings, printing inks, photoresists, etc.

Among the many substances listed here, products which are particularly suitable for use in magnetic recording media are those whose molecules contain, as double bonds which can undergo free radical polymerization, acrylyl or N-vinyl double bonds.

Instead of acrylyl compounds, it is also possible to use methacrylyl compounds. Because of their substantially lower polymerization rate, however, they should be used in no more than a small amount, in combination with acrylyl compounds. Compounds containing N-vinyl double bonds should be used in an amount such that there is not more than 50, preferably not more than 40, mol %, based on the total concentration of all polymerizable double bonds, of N-vinyl double bonds.

The choice of compounds of this type which undergo copolymerization with the polyurethane acrylate polymers during irradiation with electrons principally comprises prepolymers having two or more polymerizable double bonds in the molecule and molecular weights of less than 1,500, preferably from 500 to 1,100. These are monofunctional, bifunctional or trifunctional acrylates having molecular weights greater than 180, preferably from 220 to 400, in the form of derivatives of simple aliphatic, cycloaliphatic or aliphatic-aromatic alcohols and modifications of these, and monofunctional N-vinyl monomers in the form of N-vinyllactams, or N-vinylurethanes obtained from N-vinyl isocyanate and monofunctional alcohols.

Specific examples of these are epoxy resin acrylates as reaction products of epoxy resins with acrylic acid, optionally modified with further saturated mono- or dicarboxylic acids, or fatty acids; preferably, they are reaction products with bisphenol A epoxy resins. Other prepolymers are polyester acrylates prepared from hydroxyl-containing polyesters of aliphatic and/or cycloaliphatic or aliphatic-aromatic diols, optionally combined with triols, and saturated dicarboxylic acids, esterified with acrylic acid. Suitable urethane acrylate prepolymers are the conventional reaction products of di- or polyisocyanates with hydroxyalkyl acrylates, which reaction products have a narrow molecular weight distribution and as a rule contain only one, two or three isocyanate molecules in the urethane acrylate molecule, and whose chains can furthermore be extended with specific diols or triols.

Acrylate monomers which can be used are monofunctional monomers, eg. acrylates, oxyethylated phenols and their methyl-substituted or methoxy-substituted derivatives, such as phenoxyethyl acrylate, o- or p-cresyloxyethyl acrylate, 2,3-dimethylphenoxyethyl acrylate or 3,5-dimethylphenoxyethyl acrylate, or acrylates of derivatives of benzyl alcohol, eg. 2-(2,5-dimethylphenyl)-ethyl acrylate, 2-(o-methylphenyl)-ethyl acrylate or 2-(p-methylphenyl)-ethyl acrylate. Other monomers are isobornyl acrylate, dicyclopentadienyloxyethyl acrylate or 4-tert.-butylcyclohexyl acrylate. Because they are generally lower in odor because they have a lower vapor pressure, the acrylates having molecular weights of above 200, in particular above 220, are preferred.

Examples of acrylates having more than one double bond in the molecule are the esterification products of diols or triols, as are also used as components (3) and (5) for the synthesis of the polyurethane acrylate polymers, with acrylic acid. Examples of these are hexanediol diacrylate, neopentylglycol diacrylate, triethylene glycol diacrylate, tetraethylene glycol diacrylate, tripropylene glycol diacrylate, trimethylolpropane triacrylate, hexanetriol triacrylate, cyclohexanediol diacrylate, the diacrylate of oxyethylated bisphenol A and the diacrylate of hydrogenated bisphenol A.

Principal examples of N-vinyl monomers are N-vinylpyrrolidone, N-vinylimidazole, N-vinylcaprolactam, and the reaction products of N-vinyl isocyanate with ethyl diglycol, phenylglycol or alkyl-substituted phenylglycols or benzyl alcohols. Among the N-vinyllactams, N-vinylcaprolactam is particularly preferred because of its fairly low water solubility and the consequent insensitivity to moisture of magnetic recording layers produced with it.

Examples of modified monofunctional acrylates are the reaction products of the monohydroxyalkyl acrylates, as are also used for the preparation of the polyurethane acrylate polymers, with monofunctional isocyanates, such as methyl, propyl, isopropyl, n-butyl or phenyl isocyanate.

The preparation of the complete binder mixture for the binder matrix of the novel magnetic recording media is carried out by simply mixing the individual components.

In addition to the radiation-curable components, it is also possible to add minor amounts of higher molecular weight prior art thermoplastic magnetic binders as nonreactive components in order to optimize specific properties, eg. the anchorage or coefficient of friction of the magnetic coating. However, this generally has an adverse effect on the particularly advantageous characteristics according to the present invention, such as very rapid and gentle dispersing, the saving of a large amount of solvent, and outstanding magnetic properties such as a high orientation ratio, high remanence and increased maximum output levels.

Because of the strongly polar nature of these binders, wetting and flow problems frequently occur on certain substrates. Hence, flow improvers based on, for example, oligomeric organic fluorine compounds, siloxanes, etc., are usually added to the conventional radiation-curable coating materials. In this context, particularly preferred compounds are commercial organic fluorine assistants, in amounts of from 0.1 to 0.5% by weight, based on the binder mixture without solvents.

The novel magnetic recording media are produced in a conventional manner. To do this, the magnetic material, eg. gamma-iron(III) oxide, finely divided magnetite, undoped or doped ferromagnetic chromium dioxide, cobalt-undoped gamma-iron(III) oxide, barium ferrite or finely divided ferromagnetic metals or metal alloys, eg. Fe-Co, Co-Ni, Fe-Co-Ni, Fe-Co-B, Fe-Co-Cr-B, Mn-Bi, Mn-Al, Fe-Co-V, etc., in a solution of the electron-beam-curable binder in an organic solvent is processed into a dispersion in a dispersing apparatus, using other conventional assistants. The magnetic dispersion is then applied to the non-magnetic base with the aid of a coating apparatus, eg. a knife coater, a roll coater, a reverse roll coater or a spray coater. The conventional bases, in particular polyester films from 6 to 75 μm thick, or aluminum disks can be used as the non-magnetic base. It is also possible to use polyimide films for special applications.

Before the still liquid coating mixture is dried on the base, an operation which is advantageously carried out at from 50° to 100° C. for from 15 to 120 seconds in a conventional dryer, the magnetic particles are, if required, oriented in the intended recording direction by the action of a magnetic field. This can, if required, be followed by very slight partial polymerization of the coating with electron beams, using a dose of less than 6, preferably less than 2, kGray, or with UV light. In the latter case, it is also necessary to use a conventional highly absorbing photoinitiator. The magnetic layers are then calendered on conventional apparatus by passing the coated base material between polished rollers optionally heated to a temperature of from 30° to 80° C., preferably from 50° C. to 70° C.

Advantageously, milder conditions are employed than for conventional magnetic tapes, such conditions being sufficient in this case. The thickness of the magnetic layer is then in general from 0.5 to 20 μm, preferably from 5 to 10 μm, for tapes and from 0.5 to 3 μm for magnetic disks.

Curing of the magnetic recording layer is completed by means of accelerated electrons, the method employed being the same as that usually used for curing other kinds of surface coating. Suitable electron accelerators are those having an acceleration voltage of from 150 to 300 kV. Both scanner and linear or planar cathode apparatuses having a radiation output of more than 500, preferably more than 1,000, kGray/sec are suitable. The irradiation time or web speed is controlled so that the magnetic coating is irradiated with an energy dose of from 15 to 90, preferably from 25 to 60, kGray. The dose required for substantially complete polymerization of the double bonds is in most cases about 30–45 kGray in the case of binders which also possess good mechanical properties. A lower curing dose may be advantageous for magnetic tape applications, and higher curing doses for disk applications.

The Examples which follow illustrate the invention; the Comparative Experiments represent the state of the art. In the Examples and Comparative Experiments, parts and percentages are by weight, unless stated otherwise. The number of equivalents of the components in the polyurethane acrylate are based on 10 equivalents of hydroxyl in order to permit comparison.

EXAMPLES

Preparation and testing of polyurethane acrylate polymers and binders prepared from these The amounts, stated in the Examples below, of the components constituting the polyurethane acrylate are reacted by the following general method:

All the hydroxyl-containing compounds are initially charged together with the solvent in a dry, stirred vessel possessing a feed means and a reflux condenser, and, in order to stabilize the acrylate double bonds against premature polymerization, 2,6-di-tert.-butyl-p-cresol and tris(n-cyclohexyldiazoniumdioxy)aluminum are added, each in an amount of 1,000 ppm, based on the total weight of all hydroxy and isocyanate compounds; 1,000 ppm of dibutyl-tin-dilaurate are added as a catalyst.

The mixture is heated to 50° C. under an atmosphere of dry nitrogen. Feeding in of the isocyanate or, in the case of solid isocyanates, of a solution of the isocyanate is begun, and the reaction temperature is then brought to about 60°–65° C. while stirring and cooling. The addition takes about 30–60 minutes for the amounts of mixture described below. For large-scale production (tonnes), the feed time can be increased to 2–3 hours. When the addition is complete, stirring is continued for about 4–6 hours at this reaction temperature until the residual isocyanate content is less than 0.1% by weight, based on solid product, of NCO.

Finally, 3,000 ppm of an oligomeric organic fluorine compound are added to the mixture, as a flow improver, and the resulting polymer solution is filtered through a 5 μm filter.

The parameters specified in the Examples and relating to molecular weight, crosslinking concentration and NH concentration have been calculated on the basis of analytically obtained parameters for the starting materials, such as number of double bonds from the hydrogenation, isocyanate content and hydroxyl number. The functionality data are theoretical data for the assumed ideal structures of the compounds; these data approach the true values fairly closely but can be exactly determined in practice only at very great expense, if at all. Ideal conditions have also been assumed for the reaction of the components; in practice, these conditions are only roughly achieved owing to the fact side reactions occur on a small scale, for example as a result of the presence of varying trace amounts of water. In particular, the crosslinking concentration and the molecular weight of the polyurethane acrylate polymer can therefore differ from the calculated values by from 10 to 20%.

The magnitude and distribution of the actual molecular weight were determined by various methods in specific cases, and are roughly the same as those of the linear polyurethane acrylate systems cited above. The Fikentscher K value, which is easier to determine, is used below as a measure of the molecular weight. The possible molecular weight range is equivalent to K values (3% strength in tetrahydrofuran) of from 17 to 40, preferably from 28 to 36 for flexible recording media and from 19 to 25 for rigid ones.

To assess the curing rate and the mechanical properties, coatings of the binders were produced on sheets of glass so that the resulting dry film was from 50 to 70 μm thick, the solvent being removed by drying in the air overnight and for one hour under reduced pressure, in each case at room temperature. This was followed by irradiation with electrons under nitrogen having a residual oxygen content of less than 200 ppm, using an acceleration voltage of 175 kV, on a CB 150/15/10 type linear cathode apparatus from Energy Sciences Inc., USA.

To determine the curing rate, the web transportation speeds were chosen so that irradiation was carried out in each case with series of curing doses of 10, 20, 30, 50, 70, 100 and 150 kGray.

Any necessary slight post-curing was effected by storing the irradiated films exposed to the air for 1 day, and small residual amounts of solvent were removed by heating for one hour at 100° C. under reduced pressure.

In the case of the binder films produced on sheets of glass, the König pendulum hardness was determined directly at 23° C. according to DIN 53,157, and, by plotting the pendulum hardness as a function of the curing dose, the curing doses were determined at which 80 and 90% of the maximum pendulum hardness achieved with a curing dose of 150 kGray were attained. In general, the material is substantially completely polymerized when it exhibits about 80-90% of the maximum hardness.

Accordingly, the curing doses given in the Examples below are ones which give films exhibiting 80 and 90% of the maximum pendulum hardness and will, for brevity's sake, be referred to hereinafter as 80 and 90% doses respectively. Other methods of measuring the hardness may lead to somewhat different values for the curing rate or curing dose.

To determine the mechanical properties, such as tensile strength, elongation at break or modulus of elasticity, the irradiated films were carefully removed from the sheets of glass with the aid of a knife. Where a fluoro-organic flow improver was used, the films could in general be detached without problems. In isolated cases, films could be prepared only by applying a coating to aluminum foil and then dissolving the aluminum with dilute sodium hydroxide solution.

The modulus of elasticity was determined according to DIN 53,457, at 23° C., in general as a secant modulus at 0.1% elongation.

The tensile strength and the elongation at break were determined in accordance with DIN 53,504, likewise at 23° C.

EXAMPLE 1

A polyurethane acrylate (PUA 1) was prepared which had the following characteristic data:

| | |
|---|---|
| number average molecular weight | 6,000 |
| acrylate functionality (number average) | 3 |
| crosslinking concentration (moles of acrylate per kg) | 0.5 |
| NH concentration (moles of NH per kg) | 3.1 |

| Components in PUA | Ratio of number of equivalents | Amount in mixture (g) |
|---|---|---|
| (1) Isocyanate: TDI 80 | 10.00 | 404.6 |
| (2) polymeric diol: PBA 510 | 2.86 | 677.3 |
| (3) monomeric diol: Dianol | 3.90 | 286.2 |
| (4) OH—alkyl acrylate: HPA | 1.62 | 98.1 |
| (5) triol: TMP | 1.62 | 33.8 |

The product was prepared as a 60% strength solution in tetrahydrofuran, the Fikentscher K value (3% strength in tetrahydrofuran) being 32.4.

A binder BM 1 was prepared by mixing the following: Composition:
87.2% by weight of PUA 1
4.6% by weight of TMPTA
8.2% by weight of VCp
Characteristic data:

| | |
|---|---|
| crosslinking concentration (moles of acrylate per kg) | 0.85 |
| functionality (number average N) | 1.78 |
| functionality (weight average W) | 2.87 |
| functionality W/N | 1.61 |

Electron beam curing gave the following results:
80% dose: 10 kGray
90% dose: 21 kGray
The Figure shows the König pendulum hardness (in sec) as a function of the radiation dose (in kGray) and serves to illustrate the determination of the curing doses as 80 and 90% doses.

| Mechanical properties at | 20 | 30 | 70 kGray |
|---|---|---|---|
| Modulus of elasticity (N/mm$^2$) | 450 | 440 | 440 |
| Tensile strength (N/mm$^2$) | 40 | 41 | 470 |
| Elongation at break (%) | 110 | 96 | 106 |

Abbreviations:
TDI 80=80:20 mixture of 2,4- and 2,6-toluylene diisocyanate
PBA 510=polybutane-1,4-diol adipate, OH equivalent weight 510
dianol=bisoxyethylated bisphenol A
TMP=trimethylolpropane
HPA=2-hydroxypropyl acrylate, isomer ratio 75:25
TMPTA=trimethylolpropane triacrylate
VCp=N-vinylcaprolactam

EXAMPLE 2a

A polyurethane acrylate (PUA 2a) was prepared which had the following characteristic data:

| | |
|---|---|
| number average molecular weight | 6,000 |
| acrylate functionality (number average) | 3 |
| crosslinking concentration (moles of acrylate per kg) | 0.5 |
| NH concentration (moles of NH per kg) | 3.5 |

| Components in PUA | Ratio of number of equivalents | Amount in mixture (g) |
|---|---|---|
| (1) isocyanate: TDI 80 | 10.00 | 456.8 |
| (2) polymeric diol: PBA 510 | 2.84 | 759.3 |
| (3) monomeric diol: CHDM | 4.16 | 157.2 |
| (4) OH—alkyl acrylate: HEA | 1.50 | 91.5 |
| (5) triol: TMP | 1.50 | 35.3 |

The product was prepared as a 60% strength solution in tetrahydrofuran, the Fikentscher K value (3% strength in tetrahydrofuran) being 28.8.

A binder BM 2a was prepared by mixing the following:

| Composition | Characteristic data | |
|---|---|---|
| 88.8% by weight of PUA 2a | crosslinking concentration (moles of acrylate per kg) | 0.85 |
| 11.2% by weight of EPA 520 | functionality (number average N) | 2.42 |
| | functionality (weight average W) | 2.89 |
| | functionality W/N | 1.19 |

Electron beam curing gave the following results:

| 80% dose | | 24 kGray |
|---|---|---|
| 90% dose | | 42 kGray |
| Mechanical properties at | 30 | 70 kGray |
| Modulus of elasticity (N/mm$^2$) | 228 | 104 |
| Tensile strength (N/mm$^2$) | 41 | 36 |
| Elongation at break (%) | 98 | 104 |

Abbreviations:
TDI 80 = 80:20 mixture of 2,4- and 2,6-toluylene diisocyanate
PBA 510 = polybutane-1,4-diol adipate, OH equivalent weight 510
CHDM = cyclohexane-1,4-dimethanol
TMP = trimethylolpropane
HEA = 2-hydroxyethyl acrylate
EPA 520 = bisphenol A epoxy resin acrylate, molecular weight 520

EXAMPLE 2b

As a comparison with PUA 2a, a polyurethane acrylate PUA 2b without branching was prepared which had the following characteristic data:

| number of average molecular weight | 6,000 |
|---|---|
| acrylate functionality (number average) | 2.0 |
| crosslinking concentration (moles of acrylate per kg) | 0.33 |
| NH concentration (moles of NH per kg) | 3.50 |

| Components in PUA | Ratio of number of equivalents | Amount in mixture (g) |
|---|---|---|
| (1) isocyanate: TDI 80 | 10.00 | 456.8 |
| (2) polymeric diol: PBA 510 | 2.79 | 747.3 |
| (3) monomeric diol: CHDM | 6.20 | 234.2 |
| (4) OH—alkyl acrylate: HEA | 1.01 | 61.8 |

The product was prepared as a 60% strength solution in tetrahydrofuran, the Fikentscher K value (3% strength in tetrahydrofuran) being 28.9.

A binder BM 2b was prepared by mixing the following:
Composition:
84.3% by weight PUA 2b
15.7% by weight EPA 520
Characteristic data:

| crosslinking concentration (moles of acrylate per kg) | 0.85 |
|---|---|
| functionality (number average N) | 2.00 |
| functionality (weight average W) | 2.00 |
| functionality W/N | 1.00 |

Electron beam curing showed the following differences in curing behavior, the comparative binder BM 2b having the same composition as the binder BM 2a, with the exception of branching:

| | (Comparison) BM 2b | BM 2a |
|---|---|---|
| 80% dose | 50 kGray | 24 kGray |
| 90% dose | 75 kGray | 42 kGray |

Abbreviations:
TDI 80 = 80:20 mixture of 2,4- and 2,6-toluylene diisocyanate
PBA 510 = polybutane-1,4-diol adipate, OH equivalent weight 510
CHDM = cyclohexane-1,4-dimethanol
HEA = 2-hydroxyethyl acrylate
EPA 520 = bisphenol A epoxy resin acrylate, molecular weight 520

EXAMPLE 3a

A polyurethane acrylate PUA 3a was prepared which had the following characteristic data:

| number average molecular weight | 6,000 |
|---|---|
| acrylate functionality (number average) | 3 |
| crosslinking concentration (moles of acrylate per kg) | 0.5 |
| NH concentration (moles of NH per kg) | 3.5 |

| Components in PUA | Ratio of number of equivalents | Amount in mixture (g) |
|---|---|---|
| (1) isocyanate: TDI 80 | 10.00 | 456.8 |
| (2) polymeric diol: PBA 510 | 2.79 | 747.6 |
| (3) monomeric diol: CHDM | 4.33 | 163.7 |
| (4) OH—alkyl acrylate: HPA | 1.44 | 98.1 |
| (5) triol: TMP | 1.44 | 33.8 |

The product was prepared as a 60% strength solution in tetrahydrofuran, the Fikentscher K value (3% strength in tetrahydrofuran) being 32.2.

A binder BM 3a was prepared by mixing the following:
Composition:
88.8% by weight PUA 3a
11.2% by weight EPA 520
Characteristic data:

| crosslinking concentration (moles of acrylate per kg) | 0.85 |
|---|---|
| functionality (number average N) | 2.42 |
| functionality (weight average W) | 2.89 |
| functionality W/N | 1.19 |

Electron beam curing gave the following results:

| 80% dose | | 27 kGray |
|---|---|---|
| 90% dose | | 44 kGray |
| Mechanical properties at | 30 | 70 kGray |
| Modulus of elasticity (N/mm$^2$) | 33 | 34 |
| Tensile strength (N/mm$^2$) | 37 | 43 |
| Elongation at break (%) | 168 | 148 |

Abbreviations:
TDI 80 = 80:20 mixture of 2,4- and 2,6-toluylene diisocyanate
PBA 510 = polybutane-1,4-diol adipate, OH equivalent weight 510
CHDM = cyclohexane-1,4-dimethanol
TMP = trimethylolpropane
HPA = 2-hydroxypropyl acrylate, isomer ratio 75:25

EPA 520=bisphenol A epoxy resin acrylate, molecular weight 520

EXAMPLE 3b

As a comparison with PUA 3a, a polyurethane acrylate PUA 3b without branching was prepared which had the following characteristic data:

| number average molecular weight | 6,000 |
|---|---|
| acrylate functionality (number average) | 2.0 |
| crosslinking concentration (moles of acrylate per kg) | 0.33 |
| NH concentration (moles of NH per kg) | 3.50 |

| Components in PUA | Ratio of number of equivalents | Amount in mixture (g) |
|---|---|---|
| (1) isocyanate: TDI 80 | 10.00 | 456.8 |
| (2) polymeric diol: PBA 510 | 2.77 | 740.6 |
| (3) monomeric diol: CHDM | 6.28 | 237.2 |
| (4) OH—alkyl acrylate: HPA | 0.96 | 65.4 |

The product was prepared as a 60% strength solution in tetrahydrofuran, the Fikentscher K value (3% strength in tetrahydrofuran) being 36.1.

A binder BM 3b was prepared by mixing the following:
Composition:
84.3% by weight PUA 3b
15.7% by weight EPA 520
Characteristic data:

| crosslinking concentration (moles of acrylate per kg) | 0.85 |
|---|---|
| functionality (number average N) | 2.00 |
| functionality (weight average W) | 2.00 |
| functionality W/N | 1.00 |

Electron beam curing showed the following differences in curing behavior, the comparative binder BM 3b having the same composition as the binder BM 3a, with the exception of branching:

| | BM 3b | BM 3a |
|---|---|---|
| 80% dose | 40 kGray | 27 kGray |
| 90% dose | 70 kGray | 45 kGray |

Abbreviations:
TDI 80=80:20 mixture of 2,4- and 2,6-toluylene diisocyanate
PBA 510=polybutane-1,4-diol adipate, OH equivalent weight 510
CHDM=cyclohexane-1,4-dimethanol
HPA=2-hydroxypropyl acrylate, isomer ratio 75:25
EPA 520=bisphenol A epoxy resin acrylate, molecular weight 520

EXAMPLE 4a

A polyurethane acrylate PUA 4a was prepared which had the following characteristic data:

| number average molecular weight | 6,000 |
|---|---|
| acrylate functionality (number average) | 3 |
| crosslinking concentration (moles of acrylate per kg) | 0.5 |
| NH concentration (moles of NH per kg) | 3.5 |

| Components in PUA | equivalents | (g) |
|---|---|---|
| (1) isocyanate: TDI 80 | 10.00 | 456.8 |
| (2) polymeric diol: PBA 510 | 2.74 | 734.0 |
| (3) monomeric diol: CHDM | 4.28 | 161.8 |
| (4) OH—alkyl acrylate: BMA | 1.49 | 112.7 |
| (5) triol: TMP | 1.49 | 35.0 |

The product was prepared as a 60% strength solution in tetrahydrofuran, the Fikentscher K value (3% strength in tetrahydrofuran) being 27.9.

A binder BM 4a was prepared by mixing the following:
Composition:
95.9% by weight PUA 4a
4.1% by weight TMPTA
Characteristic data:

| crosslinking concentration (moles of acrylate per kg) | 0.85 |
|---|---|
| functionality (number average N) | 3.00 |
| functionality (weight average W) | 3.00 |
| functionality W/N | 1.00 |

Electron beam curing gave the following results:

| 80% dose | | 17 kGray |
|---|---|---|
| 90% dose | | 28 kGray |
| Mechanical properties at | 30 | 70 kGray |
| Modulus of elasticity (N/mm²) | 70 | 82 |
| Tensile strength (N/mm²) | 36 | 35 |
| Elongation at break (%) | 145 | 128 |

Abbreviations:
TDI 80=80:20 mixture of 2,4- and 2,6-toluylene diisocyanate
PBA 510=polybutane-1,4-diol adipate, OH equivalent weight 510
CHDM=cyclohexane-1,4-dimethanol
TMP=trimethylolpropane
BMA=butane-1,4-diol monoacrylate
TMPTA=trimethylolpropane triacrylate
VCp=N-vinylcaprolactam

EXAMPLE 4b

As a comparison with PUA 4a, a polyurethane acrylate PUA 4b without branching was prepared which had the following characteristic data:

| number average molecular weight | 6,000 |
|---|---|
| acrylate functionality (number average) | 2.0 |
| crosslinking concentration (moles of acrylate per kg) | 0.33 |
| NH concentration (moles of NH per kg) | 3.50 |

| Components in PUA | Ratio of number of equivalents | Amount in mixture (g) |
|---|---|---|
| (1) isocyanate: TDI 80 | 10.00 | 456.8 |
| (2) polymeric diol: PBA 510 | 2.73 | 731.0 |
| (3) monomeric diol: CHDM | 6.28 | 237.3 |
| (4) OH—alkyl acrylate: BMA | 0.99 | 75.2 |

The product was prepared as a 60% strength solution in tetrahydrofuran, the Fikentscher K value (3% strength in tetrahydrofuran) being 28.9.

A binder BM 4b was prepared by mixing the following:

| | |
|---|---|
| crosslinking concentration (moles of acrylate per kg) | 0.85 |
| functionality (number average N) | 2.43 |
| functionality (weight average W) | 2.06 |
| functionality W/N | 0.85 |

Electron beam curing showed the following differences in curing behavior, the comparative binder BM 4b having the same composition as the binder BM 4a, with the exception of branching:

| | BM 4b | BM 4a |
|---|---|---|
| 80% dose | 35 kGray | 17 kGray |
| 90% dose | 70 kGray | 28 kGray |

Abbreviations:
TDI 80=80:20 mixture of 2,4- and 2,6-toluylene diisocyanate
PBA 510=polybutane-1,4-diol adipate, OH equivalent weight 510
CHDM=cyclohexane-1,4-dimethanol
TMP=trimethylolpropane
BMA=butane-1,4-diol monoacrylate
TMPTA=trimethylolpropane triacrylate

EXAMPLE 4c

A binder BM 4c was prepared by mixing the following:
Composition:
87.2% by weight PUA 4a
4.6% by weight TMPTA
8.2% by weight VCp
Characteristic data:

| | |
|---|---|
| crosslinking concentration (moles of acrylate per kg) | 0.85 |
| functionality (number average N) | 1.67 |
| functionality (weight average W) | 2.84 |
| functionality W/N | 1.70 |

Electron beam curing gave the following results:

| | | |
|---|---|---|
| 80% dose | | 13 kGray |
| 90% dose | | 26 kGray |
| Mechanical properties at | 30 | 70 kGray |
| Modulus of elasticity (N/mm$^2$) | 352 | 426 |
| Tensile strength (N/mm$^2$) | 40 | 42 |
| Elongation at break (%) | 116 | 96 |

Abbrevations:
TDI 80=80:20 mixture of 2,4- and 2,6-toluylene diisocyanate
PBA 510=polybutane-1,4-diol adipate, OH equivalent weight 510
CHDM=cyclohexane-1,4-dimethanol
BMA=butane-1,4-diol monoacrylate
TMPTA=trimethylolpropane triacrylate

EXAMPLE 5

A polyurethane acrylate (PUA 5) was prepared which had the following characteristic data:

| | |
|---|---|
| number average molecular weight | 6,000 |
| acrylate functionality (number average) | 3 |
| crosslinking concentration (moles of acrylate per kg) | 0.5 |
| NH concentration (moles of NH per kg) | 3.5 |

| Components in PUA | Ratio of number of equivalents | Amount in mixture (g) |
|---|---|---|
| (1) Isocyanate: TDI 80 | 10.00 | 456.8 |
| (2) polymeric diol: PBA 510 | 2.92 | 781.1 |
| (3) monomeric diol: Hexanediol | 4.21 | 130.4 |
| (4) OH—alkyl acrylate: HPA | 1.44 | 98.1 |
| (5) triol: TMP | 1.44 | 33.8 |

The product was prepared as a 60% strength solution in tetrahydrofuran, the Fikentscher K value (3% strength in tetrahydrofuran) being 32.0.

A binder BM 5 was prepared by mixing the following:
Composition:
81.3% by weight PUA 5
10.5% by weight DIANOLDA
8.2% by weight VCp
Characteristic data:

| | |
|---|---|
| crosslinking concentration (moles of acrylate per kg) | 0.85 |
| functionality (number average N) | 1.53 |
| functionality (weight average W) | 2.73 |
| functionality W/N | 1.78 |

Electron beam curing gave the following results:

| | | |
|---|---|---|
| 80% dose | | 5 kGray |
| 90% dose | | 15 kGray |
| Mechanical properties at | 30 | 70 kGray |
| Modulus of elasticity (N/mm$^2$) | 128 | 155 |
| Tensile strength (N/mm$^2$) | 38 | 48 |
| Elongation at break (%) | 106 | 100 |

Abbreviations:
TDI 80=80:20 mixture of 2,4- and 2,6-toluylene diisocyanate
PBA 510=polybutane-1,4-diol adipate, OH equivalent weight 510
TMP=trimethylolpropane
HPA=2-hydroxypropyl acrylate, isomer ratio 75:25
DIANOLDA=bisoxyethylated bisphenol A diacrylate
VCp=N-vinylcaprolactam

EXAMPLE 6

A polyurethane acrylate (PUA 6) was prepared which had the following characteristic data:

| | |
|---|---|
| number average molecular weight | 6,000 |
| acrylate functionality (number average) | 3 |
| crosslinking concentration (moles of acrylate per kg) | 0.5 |
| NH concentration (moles of NH per kg) | 3.1 |

| Components in PUA | Ratio of number of equivalents | Amount in mixture (g) |
|---|---|---|
| (1) Isocyanate: MDI/TDI 1:1 | 10.00 | 492.9 |
| (2) polymeric diol: PBA 510 | 3.29 | 780.2 |
| (3) monomeric diol: Hexane-1,6-diol | 3.46 | 95.0 |
| (4) OH—alkyl acrylate: HPA | 1.62 | 98.1 |
| (5) triol: TMP | 1.62 | 33.8 |

The product was prepared as a 60% strength solution in tetrahydrofuran, the Fikentscher K value (3% strength in tetrahydrofuran) being 33.7.

A binder BM 6 was prepared by mixing the following:

Composition:
87.0% by weight PUA 6
6.3% by weight DIANOLDA
6.7% by weight VCp

Characteristic data:

| | |
|---|---|
| crosslinking concentration (moles of acrylate/kg) | 0.85 |
| functionality (number average N) | 1.57 |
| functionality (weight average W) | 2.80 |
| functionality W/N | 1.78 |

Electron beam curing gave the following results:

| | | |
|---|---|---|
| 80% dose | | 40 kGray |
| 90% dose | | 66 kGray |
| Mechanical properties at | 30 | 70 kGray |
| Modulus of elasticity (N/mm$^2$) | 52 | 91 |
| Tensile strength (N/mm$^2$) | 37 | 42 |
| Elongation at break (%) | 116 | 128 |

Abbreviations:
MDI/TDI = mixture of 1 equivalent of diphenylmethane diisocyanate with 1 equivalent of toluylene diisocyanate
PBA 510 = polybutane-1,4-diol adipate, OH equivalent weight 510
TMP = trimethylolpropane
HPA = 2-hydroxypropyl acrylate, isomer ratio 75:25
DIANOLDA = bisoxyethylated bisphenol A diacrylate
VCp = N-vinylcaprolactam

EXAMPLE 7

A polyurethane acrylate (PUA 7) was prepared which had the following characteristic data:

| | |
|---|---|
| number average molecular weight | 6,000 |
| acrylate functionality (number average) | 3 |
| crosslinking concentration (moles of acrylate per kg) | 0.5 |
| NH concentration (moles of NH per kg) | 3.33 |

| Components in PUA | Ratio of number of equivalents | Amount in mixture (g) |
|---|---|---|
| (1) Isocyanate: TDI 80 | 10.30 | 434.0 |
| (2) polymeric diol: PCL 415 | 3.20 | 645.0 |
| (3) monomeric diol: Dianol | 3.70 | 283.2 |
| (4) OH—alkyl acrylate: BMA | 1.55 | 104.3 |
| (5) triol: TMP | 1.55 | 33.6 |

The product was prepared as a 60% strength solution in tetrahydrofuran, the Fikentscher K value (3% strength in tetrahydrofuran) being 32.6.

The polyurethane acrylate PUA 7 Pwas used directly as binder BM 7, without further electron-beam-curable additives.

Electron beam curing gave the following results:

| | | |
|---|---|---|
| 80% dose | | 46 kGray |
| 90% dose | | 81 kGray |
| Mechanical properties at | 30 | 70 kGray |
| Modulus of elasticity (N/mm$^2$) | 228 | 384 |
| Tensile strength (N/mm$^2$) | 37 | 35 |
| Elongation at break (%) | 174 | 146 |

Abbreviations:
TDI 80 = 80:20 mixture of 2,4- and 2,6-toluylene diisocyanates
PCL 415 = polycaprolactonediol, OH equivalent weight 415
Dianol = bisoxyethylated bisphenol A
TMP = trimethylolpropane
BMA = butane-1,4-diol monoacrylate

EXAMPLE 8

A polyurethane acrylate (PUA 8) was prepared which had the following characteristic data:

| | |
|---|---|
| number average molecular weight | 6,000 |
| acrylate functionality (number average) | 3 |
| crosslinking concentration (moles of acrylate per kg) | 0.5 |
| NH concentration (moles of NH per kg) | 2.96 |

| Components in PUA | Ratio of number of equivalents | Amount in mixture (g) |
|---|---|---|
| (1) Isocyanate: TDI 80 | 10.00 | 386.1 |
| (2) polymeric diol: PHA 905 | 1.65 | 645.0 |
| (3) monomeric diol: Dianol | 4.86 | 331.2 |
| (4) OH—alkyl acrylate: BMA | 1.74 | 104.3 |
| (5) triol: TMP | 1.74 | 33.6 |

The product was prepared as a 60% strength solution in tetrahydrofuran, the Fikentscher K value (3% strength in tetrahydrofuran) being 31.6.

The polyurethane acrylate PUA 8 was used directly as binder BM 9, without further electron-beam-curable additives.

Electron beam curing gave the following results:

| | | |
|---|---|---|
| 80% dose | | 41 kGray |
| 90% dose | | 71 kGray |
| Mechanical properties at | 30 | 70 kGray |
| Modulus of elasticity (N/mm$^2$) | 67 | 131 |
| Tensile strength (N/mm$^2$) | 41 | 34 |
| Elongation at break (%) | 168 | 146 |

Abbreviations:
TDI 80 = 80:20 mixture of 2,4- and 2,6-toluylene diisocyanate
PHA 905 = polyhexane-1,6-diol adipate, OH equivalent weight 905
dianol = bisoxyethylated bisphenol A
TMP = trimethylolpropane
BMA = butane-1,4-diol monoacrylate

EXAMPLE 9

A polyurethane acrylate (PUA 9) was prepared which had the following characteristic data:

| | |
|---|---|
| number average molecular weight | 6000 |
| acrylate functionality (number average) | 3 |
| crosslinking concentration (moles of acrylate per kg) | 0.5 |
| NH concentration (moles of NH per kg) | 2.66 |

| Components in PUA | Ratio of number of equivalents | Amount in mixture (g) |
|---|---|---|
| (1) Isocyanate: TDI 80 | 10.30 | 346.8 |

| | | |
|---|---|---|
| (2) polymeric diol: PHA 905 | 2.22 | 776.6 |
| (3) monomeric diol: Dianol | 3.91 | 239.0 |
| (4) OH—alkyl acrylate: BMA | 1.94 | 104.3 |
| (5) triol: TMP | 1.94 | 33.6 |

The product was prepared as a 60% strength solution in tetrahydrofuran, the Fikentscher K value (3% strength in tetrahydrofuran) being 32.0.

A binder BM 9 was prepared by mixing the following:

Composition:
85.0% by weight PUA 9
4.8% by weight EPA 520
4.8% by weight TMPTA
8.2% by weight VCp Characteristic data:

| | |
|---|---|
| crosslinking concentration (moles of acrylate/kg) | 0.80 |
| functionality (number average V) | 1.62 |
| functionality (weight average W) | 2.80 |
| functionality W/N | 1.73 |

Electron beam curing gave the following results:

| | | |
|---|---|---|
| 80% dose | | 35 kGray |
| 90% dose | | 53 kGray |
| Mechanical properties at | 30 | 70 kGray |
| Modulus of elasticity (N/mm$^2$) | 116 | 168 |
| Tensile strength (N/mm$^2$) | 29 | 32 |
| Elongation at break (%) | 100 | 84 |

Abbreviations:
TDI 80 = 80:20 mixture of 2,4- and 2,6-toluylene diisocyanate
PHA 905 = polyhexane-1,4-diol adipate, OH equivalent weight 905
Dianol = bisoxyethylated bisphenol A
TMP = trimethylolpropane
BMA = butane-1,4-diol monoacrylate
EPA 520 = bisphenol A epoxy resin acrylate, molecular weight 520
TMPTA = trimethylolpropane triacrylate
VCp = N-vinylcaprolactam

EXAMPLE 10

A polyurethane acrylate (PUA 10) was prepared which had the following characteristic data:

| | |
|---|---|
| number average molecular weight | 6,000 |
| acrylate functionality (number average) | 3 |
| crosslinking concentration (moles of acrylate per kg) | 0.5 |
| NH concentration (moles of NH per kg) | 2.82 |

| Components in PUA | Ratio of number of equivalents | Amount in mixture (g) |
|---|---|---|
| (1) Isocyanate: TDI 80 | 10.30 | 368.6 |
| (2) polymeric diol: PHC 1000 | 1.68 | 650.0 |
| (3) monomeric diol: Dianol | 4.67 | 303.8 |
| (4) OH—alkyl acrylate: BMA | 1.82 | 104.3 |
| (5) triol: TMP | 1.82 | 33.6 |

The product was prepared as a 60% strength solution in tetrahydrofuran, the Fikentscher K value (3% strength in tetrahydrofuran) being 31.5.

The polyurethane acrylate PUA 10 was used directly as binder BM 10, without further electron-beam-curable additives.

Electron beam curing gave the following results:
80% dose: 44 kGray
90% dose: 64 kGray

| | | |
|---|---|---|
| 80% dose | | 44 kGray |
| 90% dose | | 64 kGray |
| Mechanical properties at | 30 | 70 kGray |
| Modulus of elasticity (N/mm$^2$) | 481 | 579 |
| Tensile strength (N/mm$^2$) | 38 | 42 |
| Elongation at break (%) | 142 | 146 |

Abbreviations:
TDI 80 = 80:20 mixture of 2,4- and 2,6-toluylene diisocyanate
PHC 1000 = polyhexane-1,6-diol carbonate, OH equivalent weight, 1,000
dianol = bisoxyethylated bisphenol A
TMP = trimethylolpropane
BMA = butane-1,4-diol monoacrylate

EXAMPLE 11

436 parts of a 55% strength binder solution in tetrahydrofuran, as described in Example 1, 928 parts of tetrahydrofuran, 1,200 parts of chromium dioxide having a coercive force of 49.0 kA/m, 1.2 parts of silicone oil and 30 parts of zinc oleate were dispersed for 46 hours in a ball mill which had a capacity of 6,000 parts by volume and was charged with 8,000 parts by weight of steel balls having a diameter of from 4 to 6 mm. The resulting dispersion was passed under pressure through a filter having 5 μm pores, and then applied to a 12 μm thick polyethylene terephthalate film by means of a conventional knife coater.

The coated film was passed through a conventional magnetic field to orient the magnetic particles and was then dried at from 60° to 80° C., after which the magnetic layer was calculated by passing the coated film twice between heated rollers at 70° C. under a nip pressure of 35 kg/cm. The magnetic layer was then 5.1 μm thick. The coating was then cured by means of an electron beam, the dose used being 20 kGray. The coated film was then slit into 3.81 mm wide audio tapes, which were subjected to magnetic, electroacoustic and mechanical tests: The roughness of the surface was determined as the average peak-to-valley height $R_z$, in accordance with DIN No. 4768, sheet 1. The electroacoustic properties of the resulting tapes were determined according to DIN Nos. 45,401, 45,403 and 45,512 (sheet 12), in comparison with reference tape C 401 R.

| Magnetic properties: | | $R_z$ | 0.21 μm |
|---|---|---|---|
| $H_c$ (kA/m) | 48.6 | Microhardness: | 10.2 kp |
| $M_r$ (mT) | 178 | | |

Orientation ratio: 3.9
Electroacoustic properties:
$E_T$ (sensitivity at long wavelengths) + 0.6 dB
$E_H$ (sensitivity at short wavelengths) + 3.2 dB
$A_T$ (maximum output level at long wavelength) + 1.5 dB
$A_H$ (maximum output level at short wavelengths) + 5.5 dB
$RG_a$ (reference level-to-noise ratio + 0.2 dB
$K_o$ (signal-to-print-through ratio) + 4.0 dB The mechanical properties of the tape in respect of abrasion, coefficient of friction, anchorage, etc., ranged from very good to excellent.

EXAMPLE 12

(a) The experiment described in Example 11 was repeated, except that the electron radiation dose was increased to 70 kGray. No significant changes in the magnetic and electroacoustic properties were observed. Microhardness: 10.7 kp (b) The experiment was repeated using a radiation dose of 100 kGray.

Microhardness: 10.7 kp

EXAMPLE 13

374 parts of a 53.5% strength binder solution in tetrahydrofuran, as described in Example 5, 1,039 parts of tetrahydrofuran, 1,200 parts of chromium dioxide having a coercive force of 39.0 kA/m, 1.2 parts of silicone oil and 30 parts of zinc oleate were dispersed for 50 hours in a ball mill which had a capacity of 6,000 parts by volume and was charged with 8,000 parts by weight of steel balls having a diameter of from 4 to 6 mm. The resulting dispersion was passed under pressure through a filter having 5 μm pores, and then applied to a 12 μm thick polyethylene terephthalate film by means of a conventional knife coater.

The coated film was passed through a conventional magnetic field to orient the magnetic particles and was then dried at from 60° to 80° C., after which the magnetic layer was calendered by passing the coated film twice between heated rollers at 70° C. under a nip pressure of 35 kg/cm. The magnetic layer was then 5.1 μm thick. The coating was then cured by means of an electron beam, the dose used being 20 kGray. The coated film was then slit into 3.81 mm wide audio tapes, which were subjected to magnetic, electroacoustic and mechanical tests, as described in Example 11.

| Magnetic properties: | | $R_z$ | 0.32 μm |
|---|---|---|---|
| $H_c$ (kA/m) | 38.5 | Microhardness: | 8.8 kp |
| $M_r$ (mT) | 200 | | |

Orientation ratio: 3.5

Electroacoustic properties:

$E_T$ (dB) +2.0
$E_H$ (dB) +1.0
$A_T$ (dB) +4.0
$A_H$ (dB) +0.5
$RG_A$ (dB) −0.2
$K_o$ (dB) +1.2

Good abrasion properties and coefficients of friction were obtained.

EXAMPLE 14

The experiment described in Example 13 was repeated, except that the electron radiation dose was increased to 70 kGray. No significant changes in the magnetic and electroacoustic properties were observed. Microhardness: 8.9 kp

EXAMPLE 15

3,207 parts of a 48.5% strength binder solution in tetrahydrofuran, as described in Example 9, 2,549 parts of tetrahydrofuran and 4,200 parts of dioxane, 7,000 parts of chromium dioxide having a coercive force of 8 kA/m, 7.0 parts of silicone oil and 175 parts of zinc oleate were dispersed for 52 hours in a ball mill which had a capacity of 30,000 parts by volume and was charged with 40,000 parts by weight of steel balls having a diameter of from 4 to 6 mm. The resulting dispersion was passed under pressure through a filter having 5 μm pores, and then applied to a 10 μm thick polyethylene terephthalate film by means of a conventional knife coater.

The coated film was passed through a conventional magnetic field to orient the magnetic particles and was then dried at from 60° to 80° C., after which the magnetic layer was calendered by passing the coated film twice between heated rollers at 70° C. under a nip pressure of 35 kg/cm. The magnetic layer was then 3.0 μm thick. The coatings were then cured by means of an electron beam, the dose used being 30 kGray. The coated film was then slit into 0.5 inch wide video tapes, which were subjected to magnetic, video and mechanical tests on a VHS recorder.

| Magnetic properties: | | $R_z$ | 0.15 μm |
|---|---|---|---|
| $H_c$ (kA/m) | 48.1 | | |
| $M_r$ (remanence in mT) | 165 | | |
| Orientation ratio | 3.7 | | |

Video properties in comparison with a $CrO_2$ reference tape:

| Output at 4.5 MHz | +2.4 dB |
|---|---|
| chroma output | +2.4 dB |
| S/N | +1.8 dB |
| chroma S/N | +0.6 dB |

Still life: longer than 60 minutes
Durability: tape still OK after 200 hours.

EXAMPLE 16

The experiment described in Example 15 was repeated and the coating was irradiated with 70 kGray. No significant differences in the video and mechanical properties were found.

We claim:

1. A magnetic recording medium which comprises a non-magnetic base and at least one magentic layer consisting of an organic binder matrix containing finely divided magnetic material, the said matrix being obtained by electron beam curing of a mixture of from 60 to 100% by weight of a polyurethane acrylate polymer possessing polymerizable acrylate double bonds and from 0 to 40% by weight of at least one compound selected from the group consisting of acrylate monomers, acrylate prepolymers and N-vinyl monomers, wherein the polyurethane acrylate polymer is branched and consists of (1) at least one diisocyanate,
(2) at least one polymeric diol having a molecular weight of from 400 to 2,500,
(3) at least one low molecular weight diol,
(4) at least one monohydroxyalkyl acrylate, and
(5) at least one low molecular weight triol, and the amount of NCO groups of the diisocyanate is from 95 to 105% of the number of equivalents of OH groups of components 2, 3, 4 and 5 and the molar amounts of the OH-containing components are chosen so that the concentration of urethane groups is from 2.4 to 3.7 moles per kg of polyurethane acrylate polymer and the mean number of acrylate groups per average molecule is greater than two and less than four, with the proviso that the polymer has a broad molecular weight distribution, the number-average molecular weight is from 2,000 to 10,000 and the ratio of the weight-average to the number-average molecular weight is from 2.2 to 3.5.

2. A magnetic recording medium as claimed in claim 1, wherein component (1) consists of a mixture of diisocyanates and polyisocyanates.

3. A magnetic recording medium as claimed in claim 1 or 2, wherein component (3) is a cyclic diol.

4. A magnetic recording medium which comprises a non-magnetic base and at least one magnetic layer consisting of an organic binder matrix containing finely divided magnetic material, the said matrix being obtained by electron beam curing of a mixture of from 60 to 100% by weight of a polyurethane acrylate polymer possessing polymerizable acrylate double bonds and from 0 to 40% by weight of at least one compound selected from the group consisting of acrylate monomers, acrylate prepolymers and N-vinyl monomers, wherein the polyurethane acrylate polymer is branched and consists of (1) a mixture of diisocyanates and polyisocyanates,
(2) at least one polymeric diol having a molecular weight of from 400 to 2,500,
(3) at least one low molecular weight diol,
(4) at least one monohydroxyalkyl acrylate, and and the amount of NCO groups of the diisocyanate is from 95 to 105% of the number of equivalents of OH groups of components 2, 3 and 4 and the molar amounts of the OH-containing components are chosen so that the concentration of urethane groups is from 2.4 to 3.7 moles per kg of polyurethane acrylate polymer and the mean number of acrylate groups per average molecule is greater than two and less than four, with the proviso that the polymer has a broad molecular weight distribution, the number-average molecular weight is from 2,000 to 10,000 and the ratio of the weight-average to the number-average molecular weight is from 2.2 to 3.5.

5. A magnetic recording medium as claimed in claim 4, wherein component (3) is a cyclic diol.

* * * * *